United States Patent [19]

Wolf

[11] 4,084,827
[45] Apr. 18, 1978

[54] JOINT FOR PIPES

[76] Inventor: Franz-Josef Wolf, Sprudelallee 19, D6483 Bad Soden Salmunster, Germany

[21] Appl. No.: 700,627

[22] Filed: Jun. 28, 1976

[30] Foreign Application Priority Data

Jul. 12, 1975  Germany .......................... 2531318

[51] Int. Cl.² ............................................. F16J 15/02
[52] U.S. Cl. ................................ 277/168; 277/DIG. 2
[58] Field of Search ............................... 277/168–172, 277/277 A; 285/230, 231, 345

[56] References Cited

U.S. PATENT DOCUMENTS 3,493,237  2/1970  Kleindienst ........................... 277/225
3,899,183  8/1975  Wild et al. ...................... 277/DIG. 2

Primary Examiner—Robert I. Smith
Attorney, Agent, or Firm—Irvin A. Lavine

[57] ABSTRACT

A joint for pipes made of, particularly, mineral materials comprising a pipe, a sleeve to receive the pipe, and a gasket ring carried by the sleeve. The gasket ring comprises a guard ring and a flange ring, the guard ring being mounted in an annular tee-slot of the sleeve and the flange ring projecting radially into the sleeve. The sleeve is provided with an inwardly projecting inversion ring and with an annular chamber following the tee-slot, to respectively pivot the guard ring and then to receive it, when a pipe is inserted. The term "sleeve" signifies not only an enlarged pipe ending but also a cuff constructed to provide for the insertion of smooth pipe endings into both ends.

5 Claims, 4 Drawing Figures

JOINT FOR PIPES

It is known that pipes fabricated of mineral materials such as stoneware, concrete, or similar substances, can be made only with relatively high tolerances as to their outer and inner diameters and with unavoidable out-of-roundness. Frequently there is also a rough surface finish, e.g. in the case of concrete or of unglazed stoneware. Pipes of this type are usually joined with tip-stretched sleeves and with gasket rings that are inserted into them. In order to insert th gasket rings, it is necessary to create concentric conditions, e.g. by means of grouting the annular tee-slots provided in them with a leveling material. It is necessary at all times, however, that the gasket ring be inserted carefully into the prepared annular tee-slot of the sleeve by means of a casting edge on the gasket ring. These operations are relatively costly, particularly since the additional use of an adhesive establishes a permanent force-fit connection between the annular tee-slot and/or sleeve and the leveling material.

Gasket rings that are pasted in are likewise unsatisfactory, especially because the outer edge of the gasket ring must of necessity lie against the inner edge of the sleeve and therefore follow its tolerances, but is unable to equalize the tolerances. The smooth surfaces of glazed stoneware and the rough surface of unglazed stoneware result in additional problems of adhesion when they are subjected to permanent strain of a mechanical or chemical nature. The present invention aims at avoiding these disadvantages.

The invention has for an object the provision of a joint for pipes as herein described in which a gasket ring can be inserted into a sleeve without difficulty and be securely fixed mechanically, in which a correct tolerance-compensating impervious joint against the surface of an inserted pipe is ensured, without any adverse effect on the elasticity of the gasket ring or its capability of withstanding continuous stress.

The invention achieves the objects by the following construction. The gasket ring between an outer guard-ring and an inner flange ring has a radial cross-piece connecting the two rings. The sleeve has an annular tee-slot which is followed, in the direction of insertion of the pipe, by an inversion ring for inverting the flange ring so that a packing washer carried by the flange ring and which initially pointed against the direction of insertion of the inserted pipe points in the direction of the insertion, after insertion of the pipe, which also compresses the flange ring and its packing washer.

Additional significant characteristics of the invention are listed below:

The guard ring need only be inserted into the annular tee-slot, and may be reinforced by means of a steel-ring insert. In accordance with the invention, the widths or axial lengths of the radial cross-piece and of the inversion ring are identical, so that the radial cross-piece is completely supported by the inversion ring following the flexing of the flange-ring and, for that reason, will not be subjected either to stretching or to compression. Further, the volume of the flange-ring and the annular chamber are such that the flange-ring, when the annular chamber is completely filled by it, undergoes an additional compression of at least 15 percent by the inserted pipe that has been inserted into the sleeve. The minimum compression will provide a satisfactory seal, and also sufficient tolerance compensation. Generally, compression can go up to 40 percent and beyond, inasmuch as increasing compression provides additional enhancement of the sealing effect. This is true particularly when the annular chamber has an upward and downward slope in the axial section of the sleeve, said slope running in the direction of the insertion, and similar to the ridge pole of a roof. Consequently, the flange ring and its packing washer will be able, in the case of extreme compression, to move over this ridge-like slope, so that an extreme pressure effect and thereby, an extreme sealing effect will be achieved.

The advantages offered by the invention may largely be found in providing a joint for pipe sections, particularly those made of mineral materials, in which the gasket ring(s) may be inserted simply or mechanically, i.e., without great care, to attach the gasket to the sleeve or cuff; the sealing of the joint is effective, even under extreme conditions, and is due to the gasket configuration and the insertion of the pipe, and not to the attachment of the gasket to the sleeve. Also the inserting of the inserted pipe prevents considerable loss of the elasticity of the gasket ring and of its capability to withstand continuous stress, because tensile and compression stresses will not occur within the area of the guard-ring end of the radial cross-piece. Only the flange ring and/or its packing washer are subject to tensile and compression stresses that are required for the purpose of satisfactory sealing. Beyond this, the flange ring and its packing washer are thus suitable to withstand any stresses that may occur. As a matter of fact, arrangement and construction of the gasket ring in accordance with the invention provide optimum properties, by increasing the range of elasticity; these properties are required by torsion, longitudinal displacement, shearing effect, and external and internal pressure. In addition the present invention enables the production of a prefabricated joint for pipes that features transport stability, assembly stability of the sealing joint, and compliance with all the requirements of building codes as to function and stability.

Figure 2:
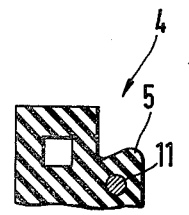
FIG. 2 is a view similar to FIG. 1, with a pipe inserted.
Figure 2:
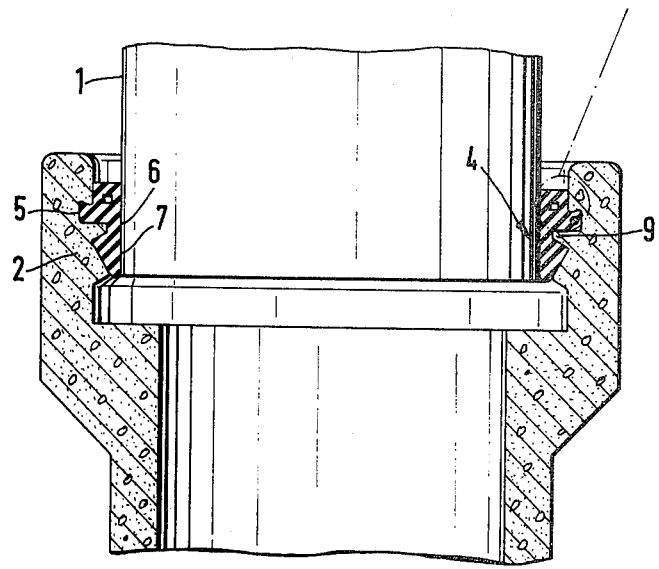
Figure 4:
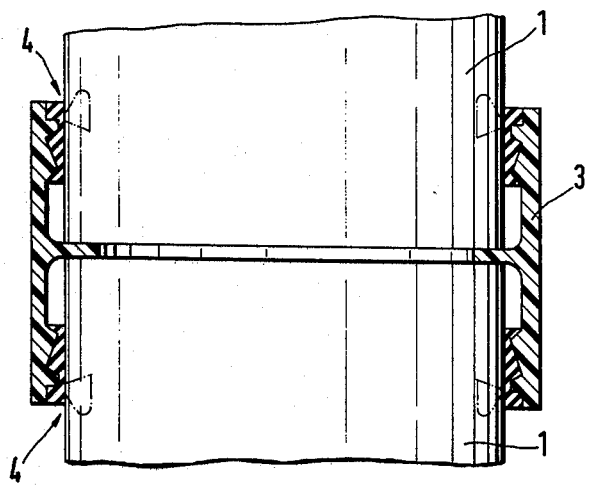
FIG. 4 is a view of the structure of FIG. 3, with pipes inserted.

Referring now to the drawings, a pipe joint is shown, suitable for joining lengths of pipe made, particularly, of mineral material. An inserted pipe 1 cooperates with a sleeve 2, or cuff 3 constructed to receive the inserted pipe 1. The sleeve 2 has a gasket ring 4, comprising a guard-ring 5 and a flange ring 7, the guard-ring 5 being inserted into an annular tee-slot 8 of the sleeve 2; the flange ring 7 projects radially inwardly into the sleeve 2. The gasket ring 4 has between guard-ring 5 and flange-ring 7 a radial cross-piece 6 that connects the two rings. The annular tee-slot 8 is, in the direction of the insertion, followed by an inversion ring 9 provided to invert the flange-ring 7, and to support the radial cross-piece 6. Flange ring 7 comprises an extending packing washer which points against the direction of insertion before the pipe 1 is inserted. Inversion ring 9 is followed by an annular chamber 10 which is shaped and dimensioned partly to receive the inverted flange-ring 7, with its extending packing washer, which, after insertion of pipe 1 as shown in FIGS. 2 and 4, points in the direction of the insertion, being also compressed by the inserted pipe 1. The guard-ring 5 may be only mechanically secured in the annular tee-slot 8, and may have a steel-ring reinforcement, as shown in FIG. 2A. The widths or axial lengths of the radial cross-piece 6 and of the inversion ring 9 are identical, so that inversion ring 9 may serve to support the flexed radial cross-piece 6. The volumes of flange-ring 7 and annular chamber 10 are such that flange-ring 7, when the annular chamber 10 is completely filled by it, will undergo a compression of at least 15 percent by inserted pipe 1 when it has been inserted into sleeve 2. The annular chamber 10 has a downward slope followed by an upward slope 12, in the direction of insertion of pipe 1 which are at an angle to each other and provide a ridge-pole appearance. FIGS. 2 and 4 illustrate that the compression of flange-ring 7 is greatest in the region of the upward slope 12.

Figure 1:
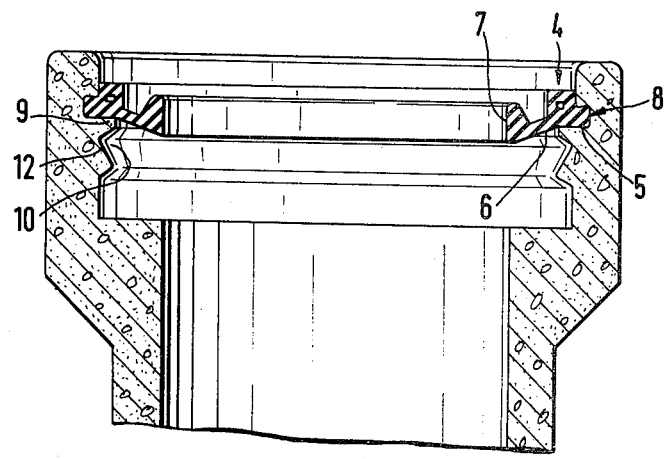
FIG. 1 is a cross-sectional view of a pipe joint sleeve in accordance with the invention, prior to the insertion of a pipe.
Figure 3:
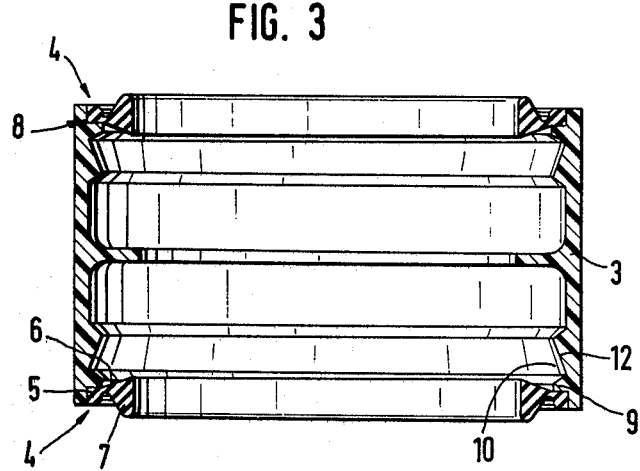
FIG. 3 is a cross sectional view of a joint, wherein a cuff is provided.

The invention has been described above particularly with reference to FIGS. 1 and 2; however FIGS. 3 and 4 provide the same construction of the gasket ring 4, there being two such gasket rings in the ends of a generally tubular cuff 3.

It is of particular importance that the annular cross-piece 6 between the guard-ring 5 and the flange-ring 7 does not undergo any significant tensile and compression stresses, but serves solely to invert the flange-ring 7 into the following annular chamger 10. The inversion takes place due to the inversion ring 9 in the sleeve 2. The actual sealing between inserted pipe and the sleeve 2 takes place within the region of the flange-ring 7 which is compressed in the respective annular chamber 10. The required tolerance compensation also takes place within that region. Only the flange-ring 7 and/or the packing washer which points in the direction of insertion after insertion is exposed to stress. In contrast, the guard-ring 5 and the radial cross-piece 6 remain largely free of any stress. For that reason, there is no loss of elasticity of the gasket ring 4 or of its capability to withstand continuous stress within the area of the guard-ring 5 and the radial cross-piece 6, as was heretofore the case. The flange ring 7 not only receives the necessary contact pressure required for sealing by virtue of the compression taking place, due to the inserted pipe in the annular chamber, but is thereby rendered suitable also for taking up the stresses that may occur, such as torsion, shearing effect, longitudinal displacement, external and internal pressures. The same effect occurs when the sleeve 2 is in the form of a cuff 3, as in FIGS. 3 and 4.

It will be obvious to those skilled in the art that various changes may be made without departing from the spirit of the invention, and therefore the invention is not limited to what is shown in the drawings and described in the specification but only as indicated in the appended claims.

I claim:

1. A joint for pipes, particularly for pipes made of mineral materials and having high tolerances and subject to out-of-roundness, comprising:
    (a) an outer sleeve for supporting a gasket ring and for receiving an inserted pipe, said sleeve having:
        (i) an annular slot for receiving a portion of a gasket ring,
        (ii) an inwardly projecting ring axially inwardly of said slot, and
        (iii) an annular chamber axially inwardly of said ring, said annular chamber being defined by a first slope which is outward and downward in the direction of insertion of a pipe and a second slope which is inward and downward in said direction and is adjacent to said first slope,
    (b) a gasket comprising:
        (i) a guard ring inserted into said slot,
        (ii) a radial cross piece extending radially inwardly from said guard ring prior to insertion of a pipe and engaging said ring of said sleeve after insertion of a pipe, and
        (iii) a flange ring connected to said guard ring by said cross piece and being radially inwardly of said guard ring prior to insertion of a pipe and filling said annular chamber after insertion of a pipe, said flange ring comprising a packing washer that points in the direction of a pipe prior to insertion and in the direction of insertion after insertion of a pipe, and
    (c) an inserted pipe,
        (i) said inserted pipe upon insertion into said gasket ring causing said radial cross piece to engage said ring of said sleeve, and compressing said flange ring in said annular chamber of said sleeve.

2. The joint of claim 1, wherein said compression of said flange ring is at least 15 percent.

3. The joint of claim 1, said guard ring comprising a metal ring reinforcement.

4. The joint of claim 1, wherein the width of said radial cross piece is substantially the same as the width of said ring of said sleeve.

5. A gasket ring for use with an inserted pipe and a surrounding outer sleeve, the sleeve having an annular slot, an inwardly projecting ring axially inwardly of said slot and an annular, triangular chamber axially inwardly of said ring, said gasket ring comprising:
    a radially outwardly extending guard ring for engagement in an annular slot,
    a radial cross piece extending radially inwardly from said guard ring and being deflectable by a pipe upon insertion thereof, and
    a flange ring connected to said guard ring by said cross piece and being radially inwardly of said guard ring, said flange ring comprising a packing washer at the inner edge thereof, said packing washer being of generally triangular radial cross section that points against the direction of insertion of a pipe thereinto when said gasket ring is positioned in a sleeve.

* * * * *